United States Patent
Tyagi et al.

(10) Patent No.: US 8,744,638 B2
(45) Date of Patent: Jun. 3, 2014

(54) METHOD AND SYSTEM FOR DEMAND RESPONSE IN A DISTRIBUTION NETWORK

(75) Inventors: Rajesh Tyagi, Niskayuna, NY (US); Jason Wayne Black, Clifton Park, NY (US); Ronald Ray Larson, Palm Bay, FL (US); Augusto Ramon Sellhorn, Tampa, FL (US); Xiaofeng Wang, Rockledge, FL (US)

(73) Assignee: General Electric Company, Niskayuna, NY (US)

(*) Notice: Subject to any disclaimer, the term of this patent is extended or adjusted under 35 U.S.C. 154(b) by 710 days.

(21) Appl. No.: 12/570,661

(22) Filed: Sep. 30, 2009

(65) Prior Publication Data

US 2011/0066300 A1   Mar. 17, 2011

Related U.S. Application Data

(60) Provisional application No. 61/241,609, filed on Sep. 11, 2009.

(51) Int. Cl.

| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *H02J 3/14* | (2006.01) | |
| *H02J 1/04* | (2006.01) | |
| *G01R 21/00* | (2006.01) | |

(52) U.S. Cl.
USPC .......... 700/295; 700/286; 700/291; 700/296; 700/297; 307/32; 307/34; 307/31; 307/38; 307/39; 307/41; 702/62

(58) Field of Classification Search
USPC ........ 700/286, 291, 295–297; 307/32, 34, 31, 307/38–39, 41; 702/62
See application file for complete search history.

(56) References Cited

U.S. PATENT DOCUMENTS 4,620,283 A    10/1986  Butt et al.
7,171,374 B1 *  1/2007  Sheehan et al. .............. 705/7.25
(Continued)

FOREIGN PATENT DOCUMENTS

CN    101383511 A    3/2009
CN    101442206 A    5/2009
(Continued)

OTHER PUBLICATIONS

Xu et al., "Demand Shifting with Thermal Mass in Ligh and Heavy Mass Commercial Buildings", Demand Response Research Center, Jul. 2007, LBNL-61172, pp. 1-40.*

(Continued)

*Primary Examiner* — Kavita Padmanabhan
*Assistant Examiner* — Jason Lin
(74) *Attorney, Agent, or Firm* — Nitin N. Joshi (57) ABSTRACT

A method and system for controlling load in a utility distribution network are provided that initiates a shed event for a node in the distribution network by selecting premisess associated with the node that are participating in a demand response program to reduce the load at the node to desired levels. More specifically, the system and method provide for selecting only enough participating premisess associated with the node that are necessary to reduce the load to desired levels.

26 Claims, 4 Drawing Sheets

(56) References Cited

U.S. PATENT DOCUMENTS

| | | | |
|---|---|---|---|
| 7,218,998 B1 * | 5/2007 | Neale | 700/295 |
| 7,349,765 B2 | 3/2008 | Reaume et al. | |
| 7,693,670 B2 * | 4/2010 | Durling et al. | 702/62 |
| 8,150,640 B2 | 4/2012 | He et al. | |
| 2003/0041037 A1 * | 2/2003 | Spool et al. | 705/80 |
| 2004/0167731 A1 * | 8/2004 | Wang et al. | 702/60 |
| 2004/0254688 A1 | 12/2004 | Chassin et al. | |
| 2007/0271006 A1 | 11/2007 | Golden et al. | |
| 2007/0276547 A1 | 11/2007 | Miller | |
| 2008/0167756 A1 * | 7/2008 | Golden et al. | 700/297 |
| 2008/0172312 A1 * | 7/2008 | Synesiou et al. | 705/34 |
| 2008/0177678 A1 * | 7/2008 | Di Martini et al. | 705/412 |
| 2008/0183337 A1 * | 7/2008 | Szabados | 700/296 |
| 2009/0045804 A1 * | 2/2009 | Durling et al. | 324/140 R |
| 2009/0093916 A1 * | 4/2009 | Parsonnet et al. | 700/286 |
| 2009/0157529 A1 * | 6/2009 | Ehlers et al. | 705/26 |
| 2009/0187284 A1 | 7/2009 | Kreiss et al. | |
| 2009/0187499 A1 * | 7/2009 | Mulder et al. | 705/30 |
| 2009/0200867 A1 | 8/2009 | Katz et al. | |
| 2009/0240381 A1 * | 9/2009 | Lane | 700/296 |
| 2010/0141046 A1 * | 6/2010 | Paik | 307/126 |

FOREIGN PATENT DOCUMENTS

| | | |
|---|---|---|
| EP | 0372961 A2 | 6/1990 |
| JP | 2008271723 A | 11/2008 |
| WO | 2007030471 A2 | 3/2007 |

OTHER PUBLICATIONS

J. W. Black et al., "Optimal Dispatch of Demand Side Electricity Resources," U.S. Appl. No. 12/290,623, filed Oct. 31, 2008.

European Search Report and Written Opinion issued in connection with corresponding EP Application No. 10175839.9-1806 dated Nov. 25, 2013.

Unofficial English translation of Office Action issued in connection with corresponding CN Application No. 201010289004.8 on Jan. 6, 2014.

Prasetijo et al., "A new load shedding scheme for limiting underfrequency", IEEE Transaction on Power Systems, vol. No. 9, Issue No. 3, Aug. 1994.

Chaozhang et al., "Probe into the Under-frequency Load Shedding Scheme based on the Dispatching", Power System Technology, vol. No. 31, Supplement 2, Dec. 2007.

* cited by examiner

Page
METHOD AND SYSTEM FOR DEMAND RESPONSE IN A DISTRIBUTION NETWORK

This application claims the benefit of pending provisional application Ser. No. 61/241,609, filed on Sep. 11, 2009

BACKGROUND

System reliability is very important for distribution networks such as utilities. Variability in load is an important factor that undermines system reliability. While utilities maintain load forecasting models and techniques, the actual system load is variable and changes continuously. There are limited methods that utilities can use to respond to variations in load or system contingencies. This is especially true at the distribution level. Methods to respond to distribution contingencies typically involve opening circuits, which leads to indiscriminant load shedding.

Demand response solutions are available that allow for the reduction of energy demand in response to peak loading conditions. The use of demand side resources to respond to contingencies on electric power systems is typically limited to bulk load shedding schemes (e.g. rolling blackouts). More specifically, bulk load shedding and/or reducing voltage (brownouts) are the current methods for dealing with overloaded circuits or transformers at the distribution level. In either method, there is significant impact for all customers in the affected area. There are limited demand response programs for large industrial and commercial customers who are willing to reduce their load on short notice to relieve overload conditions, but these are typically more able to respond to transmission level faults than distribution level faults.

Demand response solutions for distribution level contingencies, especially in residential areas, are difficult to manage because the network structure changes dynamically. This makes it difficult to identify customers who can respond to a particular contingency. While the utilities have provided some customers with direct control devices for certain loads, such as heating or cooling devices, pool pumps, and so on, the utilities are unable to efficiently and effectively manage these devices over the distribution network to respond to specific network needs.

For these and other reasons, there is a need for the present invention.

SUMMARY

A method and system for controlling load in a utility distribution network are provided that initiates a shed event for a node in the distribution network by selecting premisess associated with the node that are participating in a demand response program to reduce the load at the node to desired levels. More specifically, the system and method provide for selecting only enough participating premisess associated with the node that are necessary to reduce the load to desired levels.

DRAWINGS

The nature and various additional features of the invention will appear more fully upon consideration of the illustrative embodiments of the invention which are schematically set forth in the figures. Like reference numerals represent corresponding parts.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to a demand response method and system that enable the use of residential load resources to control load and to respond to contingencies in the power distribution network. The contingency response according to embodiments of the invention enables targeted, selective demand response that expands the range of contingencies that can be mitigated by demand response and substitutes the shedding of non-critical loads for bulk load shedding programs. The solution is targeted in that it allows for implementation at any node in the network, and selective in that it chooses the least amount and lowest impact/cost loads to shed to alleviate a given contingency. While embodiments of the invention will be described in the context of responding to contingencies in the power distribution network, it will be appreciated by those skilled in the art that the method and system can be used for other purposes such as general load control for energy conservation, or peak shaving or reduction program, for example.

As used herein, the term "node" refers to any point in the distribution network where two or more customers or premises are electrically connected, including, but not limited to, transformers and substations.

As used herein, the term "module" refers to software, hardware, or firmware, or any combination of these, or any system, process, or functionality that performs or facilitates the processes described herein.

Targeted load shedding according to embodiments of the invention allows utilities to select specific nodes for initiating shed events so that loads on non-overloaded circuits are not impacted. Selective shedding includes optimizing how much load is shed and which specific premises/devices are shed to minimize the impact on customers in the network. Once the specific node(s) is targeted, selective shedding determines the least amount of load that can be shed to eliminate overloads, and dispatches only that amount. It also ensures that non-critical/least cost loads are shed prior to any critical loads. Targeted, selective load shedding can be used proactively to deal with distribution contingencies such as overloading, for example.

Embodiments of the invention include load rebound estimation, load shed aggregation, and premises selection. The premises selection minimizes the impact on loads and maintains critical loads while restoring stability to the grid. The load shed devices at the premises include devices such as water heaters, pool pumps, air conditioning, and any other devices that allow for short term load shedding with little impact on quality of life, while allowing maintenance of critical loads such as lighting and electronics.

Figure 1:
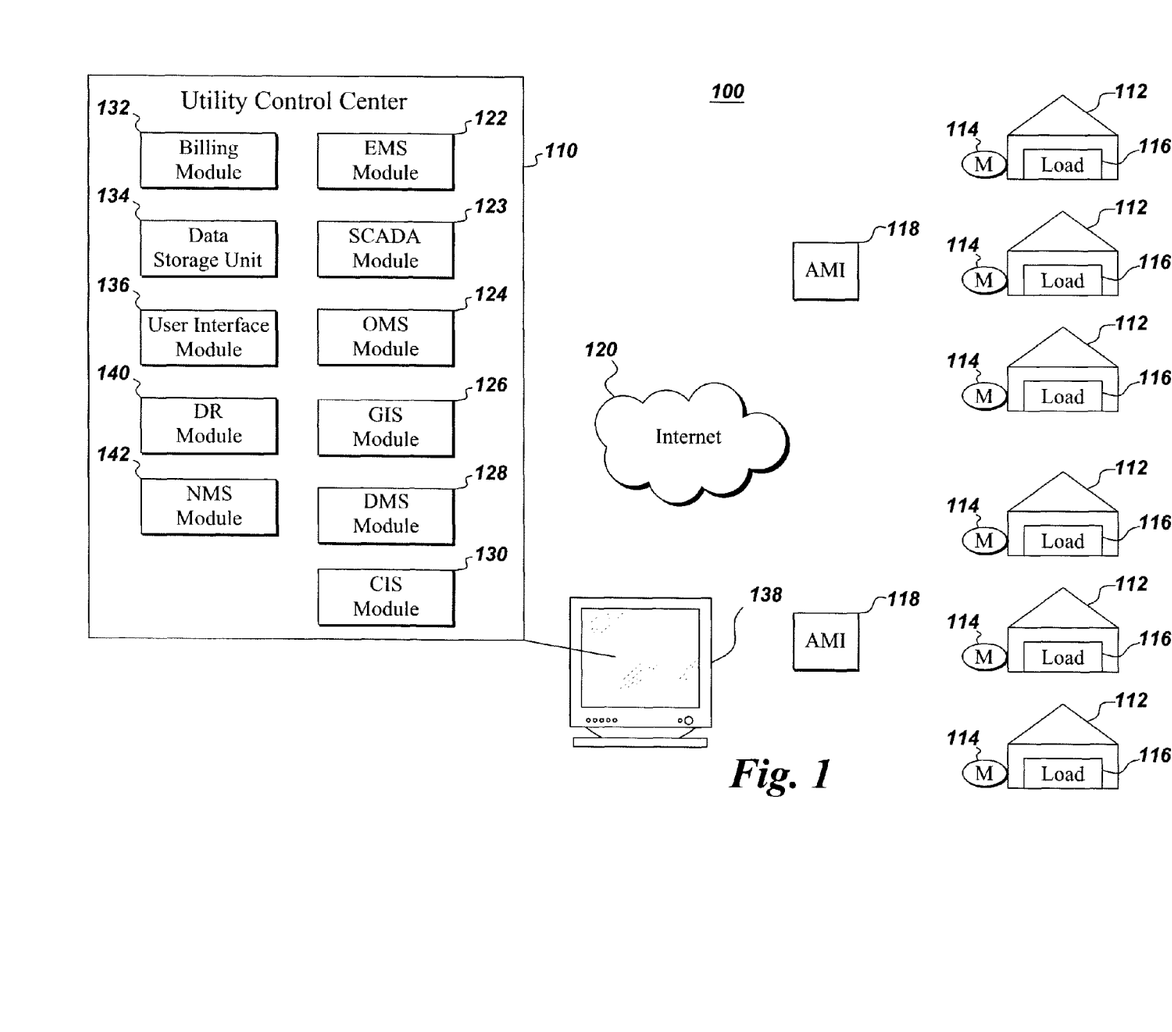
FIG. 1 illustrates a demand response system according to an embodiment of the invention.

An exemplary demand response system according to an embodiment of the invention is shown in FIG. 1. The system 100 includes a utility control center 110 and premises or utility customers 112. Each of the premises includes a utility meter 114 that measures utility usage from loads 116 at the premises. The meters 114 can be "smart" meters having transceivers (not shown), together known as Advanced Metering Infrastructure (AMI) 118 that communicate with the utility control center 110. Communication can occur via a WAN (e.g. the Internet) 120, WiMAX, broadband, and/or power line carriers, for example. Any suitable means of communication can be used. In order to facilitate the description of the embodiments of the invention, a single utility control center 110 and a limited number of utility customers 112 are shown in FIG. 1. However, it should be understood that embodiments of the invention are not limited to these numbers, and that the utility can have any number of utility control centers and customers in a distribution network.

The utility control center 110 includes an Energy Management System (EMS) module 122 that performs load forecasting for the network, and monitors, controls, and optimizes the performance of the generation and transmission system. A Supervisory Control And Data Acquisition (SCADA) module 123 provides real time information at different points in the grid and also provides local controls. An Outage Management System (OMS) module 124 monitors load status information and outage restoration information for the premises 112 in the distribution network. Some of the functions performed by the OMS module 124 include failure prediction, providing information on the extent of outages and impact to customers, and prioritizing restoration efforts. The OMS module 124 operates based on a detailed network model of the distribution system that is generated and maintained by a Geographic Information Systems (GIS) module 126. A Distribution Management System (DMS) module 128 provides real-time response to adverse or unstable network conditions by providing information on load status and load response. The DMS module 128 manages the response to alarms and/or events. Customer information including service contract information, participation in demand response programs, and contract price information, for example, is monitored and controlled by the Customer Information System (CIS) module 130. Customer billing is performed by the billing module 132. A Network Management System (NMS) module 142 provides communication management and provisioning for the DR module 140 and the meter devices 114.

The utility control center 110 also includes a data storage unit 134 for storing data such as historical data for each customer or premises in the distribution network based on information from the EMS module 122, the DMS module 128, the SCADA module 123, the DR module 140, and the OMS module 124, for example. The historical data can include information on customer utility usage including load type, time of use (TOU), duration of use, shed or demand response events, for example. The customer usage information stored in the data storage unit 134 can be updated periodically (e.g., hourly, daily) with load data including hourly load and hourly price over a twenty four hour period, environmental data including weather information (temperature, humidity, wind speed, heating and cooling degrees) and date and time information such as day of the week, season, etc. In addition, the data storage unit 134 stores event data for each customer. More specifically, the data storage unit 134 stores historical information on whether a customer participated in a demand response event, the start time and end time, day of week, season, etc. A user interface module 136 provides information to an operator at the utility control center 110 via a display 138, for example.

A Demand Response (DR) module 140 in the utility control center 110 utilizes information from the various modules in the utility control center 110 to respond to power demand events in the power distribution network such as network contingencies requiring a reduction in load. According to embodiments of the present invention, the DR module 140 responds to an event by implementing targeted and selective load shedding.

Many utility customers participate in demand response programs where they receive compensation for agreeing to shed load at short notice when necessary. The demand response process according to embodiments of the present invention optimizes the response to a load shedding event by only accessing customers in an identified affected area that have agreed to participate in a load shedding program. Customers in the affected area are selected as needed and on a least cost basis to minimize the cost of the load shedding event. The load shed is either directly controlled by the utility through switching or implemented by customers. More particularly, the load shed is implemented by direct or indirect load control such that utilities can either remotely switch off the devices agreed upon by contract (e.g., HVAC units), as indicated in the CIS module 130, or send a load control signal to a home/building energy management (HEM) system for a load reduction. The HEM system can then determine which devices to curtail in order to meet the utility requirement. A load shed in support of the contingency response could also be achieved via a dynamic pricing program, where in response to a rate discount, customers agree to variable pricing for a certain number of emergency events. Upon receiving an emergency price, customers will decide how much load to reduce. The desired system level shed could be achieved by sending the signal to appropriate number of customers, based on their estimated price responsiveness.

The shed amount will depend on the devices that will be affected (e.g., HVAC, water heater, etc.), the type of control (e.g., on/off/set back), and their current status (e.g., running, not running). Compensation can have a fixed component for participating, and a variable component based on the amount of shed in each event. In addition, contracts can specify the number of times that the customer can be called upon to participate in a load shed event, and this number may vary from customer to customer.

Figure 2:
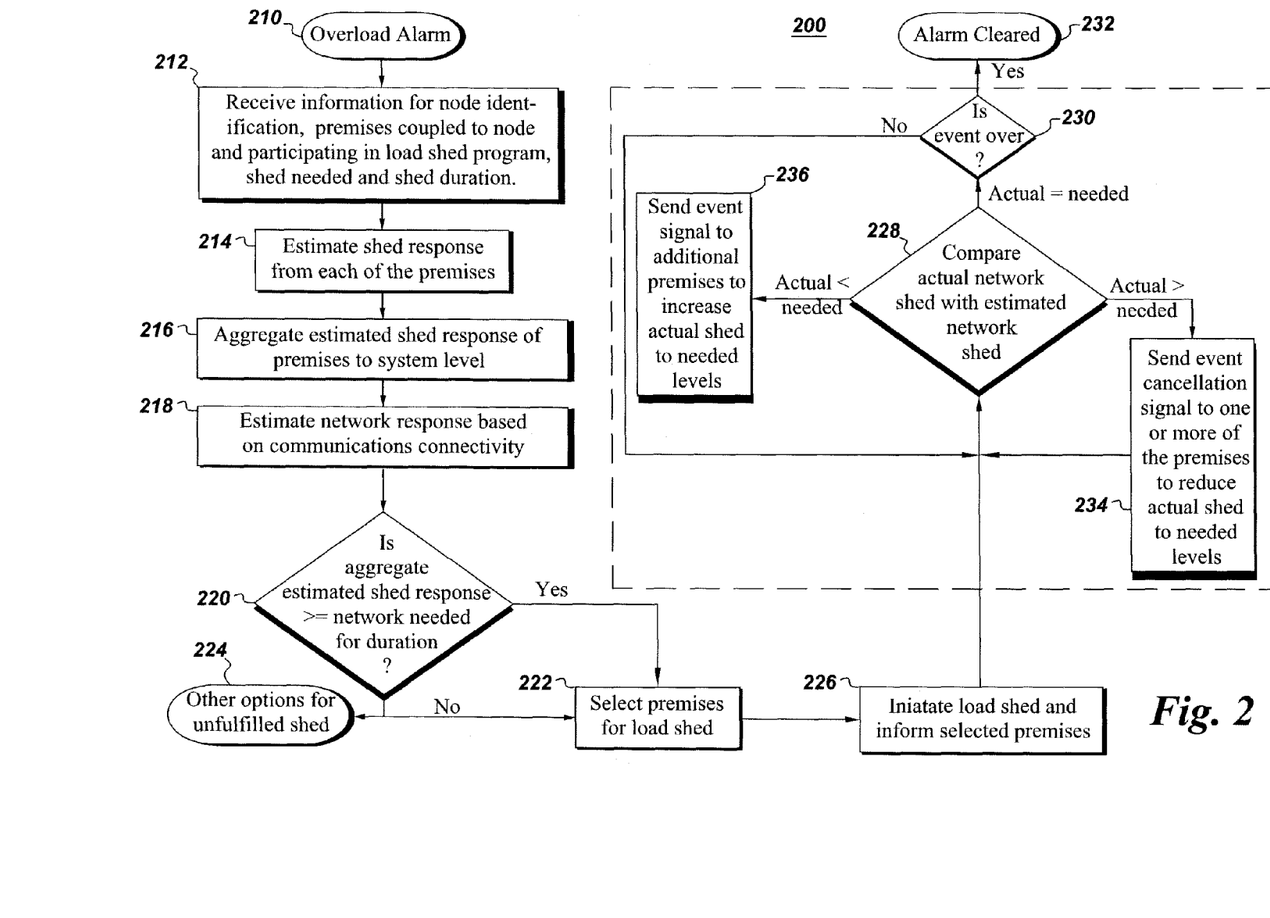
FIG. 2 illustrates a flow diagram of a demand response control process associated with the demand response control system depicted in FIG. 1, according to one embodiment of the invention.

FIG. 2 shows a flow diagram for a demand response process according to an embodiment of the invention. The DR module 140 communicates with the other modules in the utility control center 110 including the EMS module 122, the OMS module 124, the GIS module 126, the DMS module 128, the CIS module 130, and the user interface module 136. The information received from the various modules is used to determine the demand response in the demand response process 200. The process 200 can be initiated automatically or by a utility operator upon notification that an overload situation has occurred or is about to occur, as shown in step 210. The process can also be initiated whenever the utility determines that a load shedding event should be called and is consistent with customer contracts.

Once the process is initiated, in step 212, the DR module 140 receives information from the DMS Module 128, the AMI 118, and the OMS module 124, for example, identifying the node or area in the distribution network experiencing a demand for power that exceeds or will soon exceed the available power, the identification of the premises associated with the node participating in the load shed program, the load shed needed and the duration of the load shed needed to respond to the event. Alternatively, the amount of shed and the shed duration can be entered by the operator via the user interface 138 and the user interface module 136. In step 214, the process estimates the shed response from each of the premises associated with the affected node. More specifically, step 214 estimates the amount of load shed that can be provided by each of the premises associated with the node that are part of a load shed program. The available shed response for each of the participating premises can be estimated from real time data and/or historical data. The DR module 140 obtains the real time data from a HEM, the meters 114, the EMS module 122, the DMS module 128 or contract parameters. Historical data is obtained from the data storage unit 134. The estimated amounts are aggregated in step 216 to determine the total amount of load shed available from the participating premises associated with the node to respond to the event.

In step 218, the process then estimates the network response to the overload event based upon the estimated aggregated load shed determined in step 216. This estimation is performed since it is possible that some premises may experience communication/control failures with the network management system and will not receive the DR signal. Therefore, the aggregated response availability must be adjusted to reflect these failures. If the estimated aggregated response is greater than the network needs in step 220, then a shed event is called and premises are selected for load shedding in step 222. If the estimated aggregated response is less than the network needs in step 220, then it suggests that calling the shed event even for all participating premises may not be sufficient to avoid the overload contingency and therefore additional responses to the overload event must be considered in addition to calling the shed event, as shown in step 224.

While comparing the estimated shed response versus the needed shed response, both the shed amount (kW or MW) and the duration must be satisfied in order for the sufficiency of shed response to be determined. One way to determine this is to use the energy (shed multiplied by duration) as a comparison measure. In this case, the needed network energy is computed and compared to the aggregated energy for all participating premises. Since network shed duration may be different than premises shed durations allowed by individual premises contracts, the premises may need to be scheduled to shed loads at different times. Note that since distribution systems typically supply three-phase electric power, premises are assigned to one of the phases in such a way that the total load is evenly spread across each phase. Thus, shed times for premises should be scheduled such that load balance on all phases is maintained. This type of scheduling problem is often referred to as knapsack problem in operations research literature. To quickly estimate response sufficiency, a slack factor can be used to account for scheduling constraints. For example, it can be inferred that there is sufficient response if the aggregated premises energy is at least 120% of the needed energy, for example. The number may be more than 120% or less depending on the relative size of the premises sheds as compared to the required network shed.

Once the premises are selected in step 222, the DR module 140 initiates the load shedding event in step 226 and the corresponding customers are informed. More specifically, the DR module 140 and the DMS module 128 sends signals to the selected premises indicating an event has been initiated, identifying the event type, the requested shed amount, the start time, and the duration. The signals are sent using the AMI 118 and the NMS module 142, for example. In addition to or instead of automatic initiation, the customers can be informed via email or a phone call. In some applications, an acknowledgement signal is supplied to the utility control center 110 from the premises. In step 228, the actual network response to the load shed of the selected premises is determined by information supplied from the DMS module 128, EMS module 122, or SCADA module 123, and the OMS module 124. If the estimated network response is satisfied by the actual load shed of the selected premises, it is determined whether the event is over (shed duration has been met) in step 230. If the event is over, then the alarm is cleared in step 232. If the event is not over, the processing returns to step 228. If it is determined in step 228 that the load shed of the selected customers is greater than the network need, then a cancellation notice is supplied to one or more of the selected customers in step 234. If it is determined in step 228 that the load shed of the selected premises is less than the network need, then additional premises are selected in step 236. The increasing and decreasing of selected customers may be done incrementally, for example, or in any other suitable manner. In either case, the process returns to step 228 for continuous monitoring until the event is determined to be over in step 230.

Figure 3:
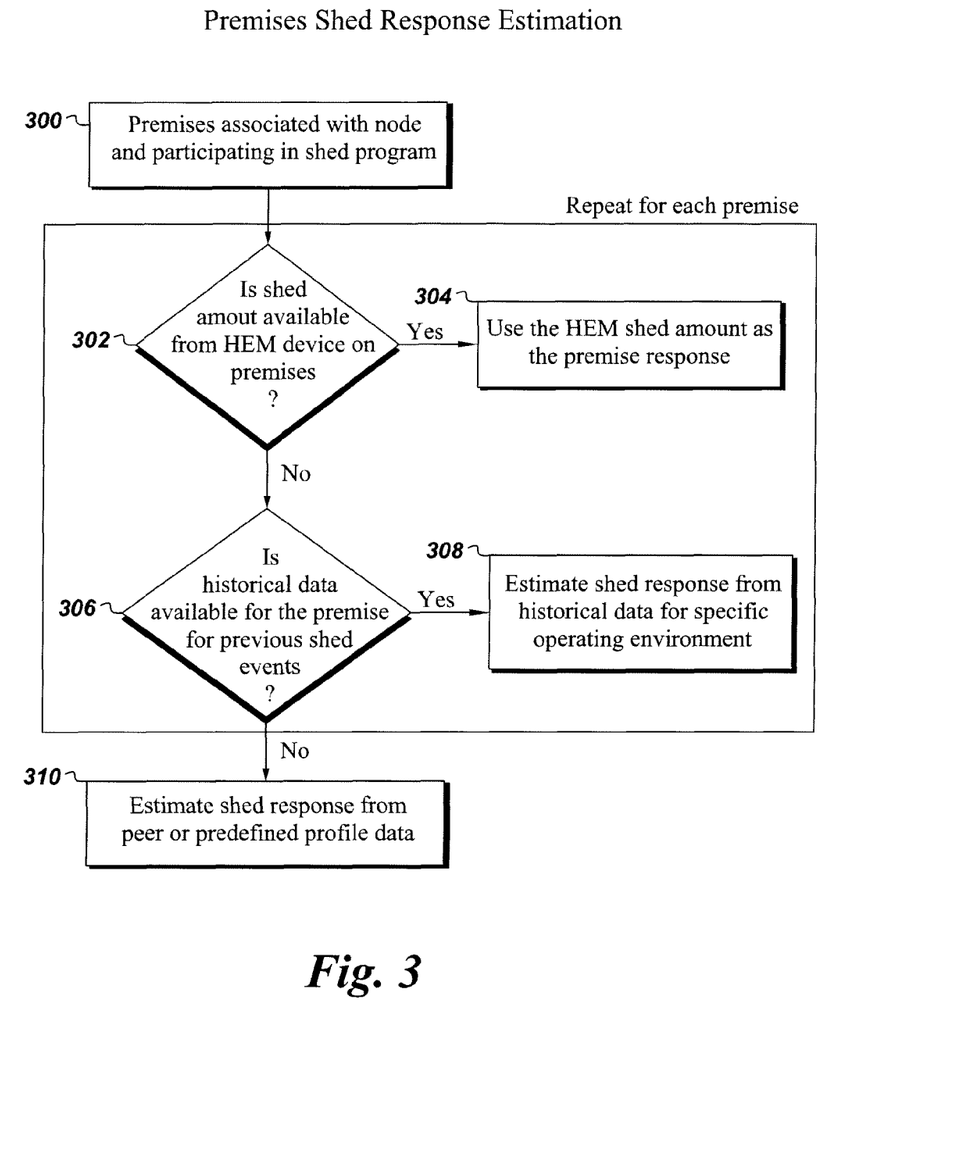
FIG. 3 illustrates a flow diagram of a premises response estimation process according to an embodiment of the invention.

The flow diagram in FIG. 3 illustrates the process for estimating the premises shed response of the participating customers associated with the affected node. Based upon the information supplied to the DR module 140 concerning premises associated with the node and participating in a load shed program shown in step 300, steps 302-308 are performed for each of the associated premises. The process determines whether a load shed amount is available from a HEM system that may be located at the premises in step 302. If this information is available from the HEM, then the data is applied as the estimated shed response for that premises in step 304. If it is determined in step 302 that the premises does not include a HEM device, then it is determined in step 306 whether historical data exists in the data storage unit 134 for the premises for previous shed events. If it is determined that historical data for the premises does exist, then the historical data is applied as the estimated shed response for that premises in step 308. If it is determined in step 306 that no historical data exists for the premises, then, in step 310, the estimated shed response for the premises is determined based upon historical data from a similar premises stored in the data storage unit 134 or from a predetermined profile in the data storage unit 134.

The process for using historical data as the estimated shed response for a premises will be discussed in greater detail. As previously noted, status information for each of the premises is stored in the data storage unit 134. The frequency of data retrieval and storage can vary and can be set to any frequency suitable to the application. For purposes of discussion, the frequency of retrieval and storage is considered to be daily or every twenty-four hours. The DR module 140 retrieves data for a premises from the data storage unit 134. The DR module 140 determines which days in the past most closely resemble the current day. More specifically, it is determined which past days most closely corresponds to the current day in time of use, day of week, season, temperature, humidity and any other data for that premises that would affect load. If one or more similar days are found, it is determined whether a demand response event occurred on any of these days. If similar days are found that have had a demand response, then an average of responses on those days can be used as the response estimate for the current load shedding event.

By way of example, if the current day is a Sunday in summer at noon, then the DR module 140 searches for data corresponding to a past Sunday in summer at noon. It will also determine whether there is such a day when the premises was part of a demand response event. If such a day is found, the load shed response for that premises on that day is retrieved and this amount is used as the estimated shed response for that premises. If more than one similar day is found, then an average of the load shed responses is used as the estimated load shed response for that premises. To compute the response using historically similar days where one experienced a demand response event and the other did not, compare the data and the difference between the data can be applied as the estimated shed response for the premises.

If no similar day having a demand response event is found, then the DR module 140 uses data from another day when a demand response event occurred and uses the response rate from that day as the estimated shed response for the premises for the current event. In other words, if there is a past day that responded to a demand response event and the response was a ten percent load shed, then determine the value of a ten percent load shed under the current conditions and use this value as the estimated shed response for the premises. Similarly, multiple past days with demand response events can be used to provide the estimated shed response for the premises by applying regression techniques to the load data from those days.

Another estimation approach includes averaging a shed response from a number of different premises in the neighborhood having similar size, number of rooms, number of floors, etc. The average shed response can be used as the estimated shed response of the subject premises.

Another approach includes estimating shed response using predetermined profile data. The profile data can include a number of standard profiles based on size of premises, number of rooms, and number of floors, etc., and typical shed amounts for each under different conditions. During the estimation process, the DR module 140 selects the profile that most closely resembles the subject premises and uses the shed amount for corresponding conditions as the estimated shed response for the premises.

Figure 4:
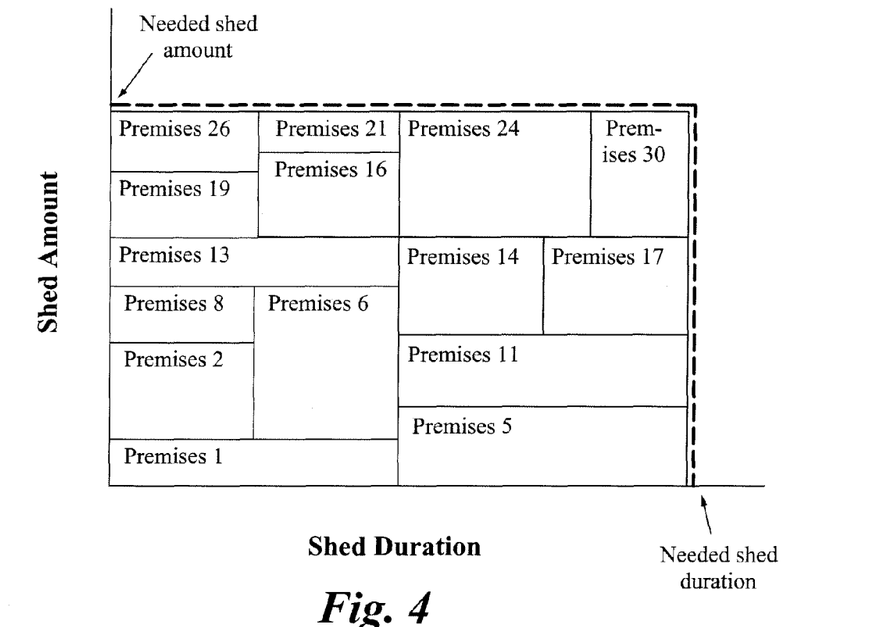
FIG. 4 is a graph illustrating scheduling of premises response according to an embodiment of the invention.

The premises selection process in step 222 of FIG. 2 is complicated by the fact that each premises may have a maximum shed amount and/or duration agreed upon in the customer contract. Shed costs may differ from one premises to another. In addition, customer contracts may limit the times that they agree to participate in a demand response event. Since the maximum shed and the duration may vary from one premises or customer to another, the actual shed event duration may be longer than the shed duration permitted by some premises, equal to the shed duration for other premises and more than the duration for others. As shown in FIG. 4, in order to meet a system level shed amount and duration for the node, premises will generally be scheduled to shed load at different times and for different durations so that the cumulative effect is to satisfy the system level shed requirements at minimum cost while maintaining load balance across all three phases of the power distribution system.

One goal for the utility is to minimize the cost of responding to a demand response event. Therefore, the premises selection process can be performed based on lowest cost. The selection process can be formulated as a multidimensional knapsack problem studied in operations research literature, for example. There are many ways to solve this problem including mathematical programming, dynamic programming, and greedy algorithms, among others. For example, one approach is to use a greedy algorithm where selection begins with lowest price and proceeds filling or selecting to obtain needed shed amount, as shown along the y-axis in FIG. 4, and then selecting further to fulfill duration requirements along the x-axis in FIG. 4. In this process, some premises may not need to be called upon for the entire contract shed duration, i.e., only utilized for amount which satisfies algorithm to meet shed amount and duration needs.

Figure 5:
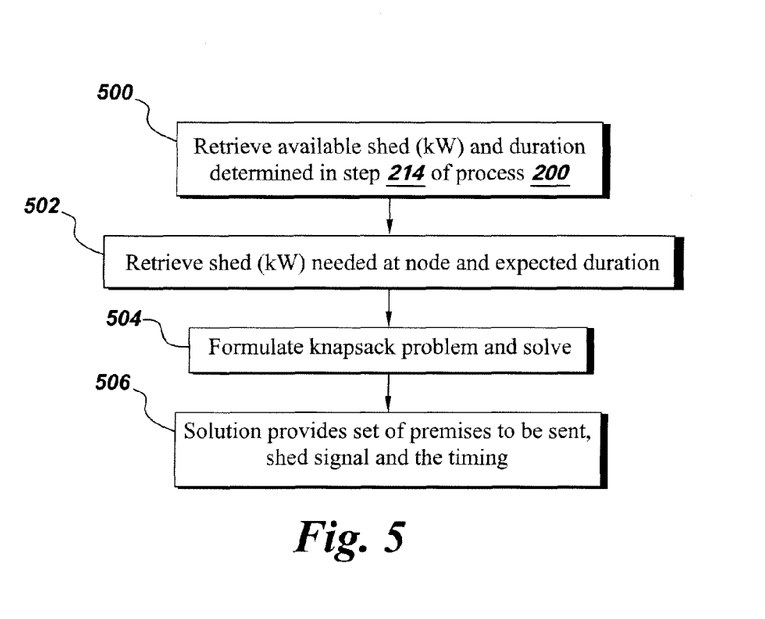
FIG. 5 illustrates a flow diagram of a premises selection process according to one embodiment of the invention.

FIG. 5 is a flow diagram further explaining step 222 of selecting premises for load shed shown in FIG. 2. In step 500, the selection process begins by retrieving the available shed (kW) and the duration (e.g. minutes, hours) determined at step 214 of FIG. 2. In step 502, the network shed need at the node and the expected duration (e.g., minutes, hours) are retrieved. In step 504, a knapsack problem is formulated and solved, using techniques discussed above, for selecting the premises to satisfy the shed need and duration. In step 506, the solution provides a set of premises to shed to satisfy the needed shed amount and duration at the node.

In estimating the premises shed response, the rebound effect is considered. This refers to the phenomenon that in practice many types of demand will actually consume more than their "normal" state following a curtailment or shed event. This increase in subsequent periods can be called a "rebound effect." In estimating the premises response from historical data, the premises load on similar days with a shed event and without a shed event is compared. This difference will automatically include the rebound effect. The same applies to other sources of estimating shed response including real time estimation and profile estimation. In real-time estimation (data obtained from a HEM, for example), the HEM must account for load rebound when providing the shed estimate. Similarly, the profile shed will also include rebound in the profile since the profile is created from historical data.

In summary explanation, embodiments of a targeted and selective demand response method and system are disclosed that expand the range of contingencies that can be mitigated by demand response and substitutes the shedding of non-critical loads for bulk load shedding programs. The embodiments provide for targeting a node within a distribution network requiring a demand response and implementing the demand response by selecting premises associated with the node and participating in the demand response program to reduce the load to acceptable levels. More specifically, the system and method provide for selecting only enough participating premises associated with the node that are necessary to reduce the load to acceptable levels. In addition, the premises selected account for the lowest impact/cost to alleviate the given contingency.

While embodiments of the invention will be described in the context of responding to contingencies in the power distribution network, it will be appreciated by those skilled in the art that the method and system can be used for other purposes such as general load control for energy conservation, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for controlling load in a distribution network of customers of a utility, wherein each of the customers has corresponding premises, comprising:

receiving information from the utility for a node in the distribution network demanding power above a predetermined threshold, wherein the information comprises node identification information, a shed amount and a shed duration required to reduce the power demand below the predetermined threshold, and information identifying participating customer premises associated with the node and participating in a load shed program from the utility;

estimating a load shed response for the participating customer premises;

estimating an adjusted load shed response based on a network connectivity;

comparing the adjusted load shed response with the shed amount and the shed duration required to reduce the power demand below the predetermined threshold to determine a node response to the adjusted load shed response;

initiating a load shed event when the node response is sufficient to reduce the power demand below the predetermined threshold; and selecting one or more of the participating customer premises for the load shed event based on the node response.

2. The method of claim 1, wherein the estimating the load shed response further comprises:

estimating a rebound affect for the participating customer premises.

3. The method of claim 2, wherein estimating a rebound affect for the participating customer premises comprises comparing participating customer premises load on similar days with the load shed event and without the load shed event.

4. The method of claim 1, further comprising:

informing the one or more participating customer premises of the load shed event;

comparing an actual node response with the node response for the one or more participating customer premises; and adjusting the one or more participating customer premises selected for the load shed event based on the comparison.

5. The method of claim 4, wherein the adjusting comprises:

increasing a number of the participating customer premises when the actual node response is less than the node response; and decreasing a number of the participating customer premises when the actual node response is more than the node response.

6. The method of claim 1, wherein the estimating the load shed response of the participating customer premises comprises obtaining, for each of the participating customer premises, load shed data from one of a device located at the participating customer premises, a load shedding history profile for the participating customer premises, a load shedding history profile for another participating customer premises, or a predefined premises profile.

7. The method of claim 6, wherein the obtaining the load shed data from the device located at the participating customer premises comprises obtaining the load shed data from a home energy management system arranged at the participating customer premises.

8. The method of claim 6, wherein the obtaining the load shed data from the load shedding history profile for the participating customer premises comprises:

comparing current load shed condition data with historical load shed condition data in the load shedding history profile for the participating customer premises;

identifying a previous load shed event that most closely matches the current load shed condition for the shed event;

retrieving a past load shed response for the previous load shed event; and applying the past load shed response as the load shed data.

9. The method of claim 6, wherein the obtaining load shed data from the load shedding history profile for another participating customer premises comprises:

comparing a participating customer premises profile for the participating customer premises with other participating customer premises profiles;

identifying a different participating customer premises profile that most closely matches the participating customer premises profile;

comparing current load shed condition data for the participating customer premises with historical load shed condition data in a load shedding history profile for the different participating customer premises;

identifying a previous load shed event for the different participating customer premises that most closely matches the current load shed condition data for the shed event;

retrieving a past load shed response for the previous load shed event for the different participating customer premises; and applying the past load shed response for the different participating customer premises as the load shed.

10. The method of claim 6, wherein the obtaining the load shed data from the predefined premises profile comprises:

comparing a participating customer premises profile for the participating customer premises with predefined premises profiles;

identifying the predefined premises profile that most closely matches the participating customer premises profile;

retrieving profile load shed data for the predefined premises profile; and applying the profile load shed data for the predefined premises profile as the load shed data.

11. The method of claim 1, wherein the selecting the one or more of the participating customer premises for the load shed event comprises:

utilizing operations research methods to determine a set of the participating customer premises to select for the load shed event.

12. The method of claim 11, wherein the utilizing operations research methods comprises utilizing a knapsack problem formulation.

13. The method of claim 12, wherein the selecting the one or more of the participating customer premises for the load shed event comprises:

utilizing one of mathematical programming, dynamic programming, or greedy algorithms; and solving the knapsack problem formulation.

14. A non-transitory computer-readable medium comprising computer-readable instructions of a computer program that, when executed by a processor, cause the processor to perform a method for controlling load in a distribution network of customers of a utility, wherein each of the customers has corresponding premises, the method comprising:

receiving information from the utility for a node in the distribution network demanding power above a predetermined threshold, wherein the information comprises node identification information, a shed amount and a shed duration required to reduce the power demand below the predetermined threshold, and information identifying participating customer premises associated with the node and participating in a load shed program from the utility;

estimating a load shed response for the participating customer premises;

estimating an adjusted load shed response based on a network connectivity;

comparing the estimated adjusted load shed response with the shed amount and the shed duration required to reduce the power demand below the predetermined threshold to determine a node response to the estimated adjusted load shed response;

initiating a load shed event when the node response is sufficient to reduce the power demand below the predetermined threshold; and selecting one or more of the participating customer premises for the load shed event based on the node response.

15. The non-transitory computer-readable medium of claim 14, wherein estimating the load shed response of the participating customer premises comprises obtaining, for each of the participating customer premises, load shed data from one of a device located at the participating customer premises, a load shedding history profile for the participating customer premises, a load shedding history profile for another participating customer premises, or a predefined premises profile.

16. The non-transitory computer readable medium of claim 15, wherein the selecting the one or more of the participating customer premises for the load shed event comprises:

utilizing operations research methods to determine a set of the participating customer premises to select for the load shed event.

17. The non-transitory computer-readable medium of claim 16, wherein the utilizing operations research methods comprises utilizing a knapsack problem formulation.

18. The non-transitory computer-readable medium of claim 17, wherein the selecting the one or more of the participating customer premises for the load shed event comprises:

utilizing one of mathematical programming, dynamic programming, or greedy algorithms; and solving the knapsack problem formulation.

19. A system for controlling load in a distribution network of customers of a utility, wherein each of the customers has corresponding premises, the system comprising:

a first module configured to receive information identifying a node in the distribution network demanding power above a predetermined threshold, wherein the information comprises a shed amount and a shed duration required to reduce the power demand below the predetermined threshold;

a second module configured to identify participating customer premises associated with the node and participating in a load shed program from the utility;

a third module configured to:

estimate a load shed response of the participating customer premises;

estimate an adjusted load shed response based on a network connectivity;

compare the adjusted load shed response with the shed amount and the shed duration required to reduce the power demand below the predetermined threshold to determine a node response to the adjusted load shed response;

initiate a load shed event when the node response is sufficient to reduce the power demand below the predetermined threshold; and a fourth module configured to transmit control signals to the selected participating customer premises to reduce a load for the load shed event.

20. The system of claim 19, wherein the third module is further configured to:

inform the one or more participating customer premises of the load shed event;

compare an actual node response with the node response for the one or more participating customer premises; and adjust the one or more participating customer premises selected for the load shed event based on the comparison.

21. The system of claim 20, wherein the third module adjusts the one or more participating customer premises selected for the load shed event by increasing a number of the participating customer premises when the actual node response is less than the node response, and decreasing a number of the participating customer premises when the actual node response is more than the node response.

22. The system of claim 19, wherein the third module estimates the load shed response of the participating customer premises by obtaining, for each of the participating customer premises, load shed data from one of a device located at the participating customer premises, a load shedding history profile for the participating customer premises, a load shedding history profile for another participating customer premises, or a predefined premises profile.

23. The system of claim 22, wherein the third module obtains the load shed data from a home energy management system arranged at the participating customer premises.

24. The system of claim 22, wherein the third module obtains the load shed data from the load shedding history profile for the participating customer premises by:

comparing current load shed condition data with historical load shed condition data in the load shedding history profile for the participating customer premises;

identifying a previous load shed event that most closely matches the current load shed condition for the shed event;

retrieving a past load shed response for the previous load shed event; and applying the past load shed response as the load shed data.

25. The system of claim 22, wherein the third module obtains the load shed data from the load shedding history profile for another participating customer premises by:

comparing a participating customer premises profile for the participating customer premises with other participating customer premises profiles;

identifying a different participating customer premises profile that most closely matches the participating customer premises profile;

comparing current load shed condition data for the participating customer premises with historical load shed condition data in a load shedding history profile for the different participating customer premises;

identifying a previous load shed event for the different participating customer premises that most closely matches the current load shed condition data for the shed even;

retrieving a past load shed response for the previous load shed event for the different participating customer premises; and applying the past load shed response for the different participating customer premises as the load shed.

26. The system of claim 22, wherein the third module obtains the load shed data from the predefined premises profile by:

comparing a participating customer premises profile for the participating customer premises with predefined premises profiles;

identifying the predefined premises profile that most closely matches the participating customer premises profile;

retrieving profile load shed data for the predefined premises profile; and applying the profile load shed data for the predefined profile as the load shed data.

\* \* \* \* \*

UNITED STATES PATENT AND TRADEMARK OFFICE
CERTIFICATE OF CORRECTION

PATENT NO.        : 8,744,638 B2                                    Page 1 of 1
APPLICATION NO.   : 12/570661
DATED             : June 3, 2014
INVENTOR(S)       : Tyagi et al.

It is certified that error appears in the above-identified patent and that said Letters Patent is hereby corrected as shown below:

In the Claims

In Column 10, Line 66, in Claim 14, delete "estimated adjusted" and insert -- adjusted --, therefor.

In Column 11, Line 2, in Claim 14, delete "estimated adjusted" and insert -- adjusted --, therefor.

In Column 12, Line 51, in Claim 25, delete "even;" and insert -- event; --, therefor.

Signed and Sealed this
Ninth Day of December, 2014

Michelle K. Lee
*Deputy Director of the United States Patent and Trademark Office*